Sept. 6, 1966 ROBERT T. W. LIANG 3,271,539
TURN SIGNALING CANCELING MECHANISM
Filed Dec. 19, 1961 2 Sheets-Sheet 1

ROBERT T. W. LIANG
INVENTOR
BY John R. Faulkner
Keith L. Jerschling
ATTORNEYS

Sept. 6, 1966 ROBERT T. W. LIANG 3,271,539
TURN SIGNALING CANCELING MECHANISM
Filed Dec. 19, 1961 2 Sheets-Sheet 2

ROBERT T. W. LIANG
INVENTOR

BY *John L. Faulkner*
*Keith L. Zerschling*
ATTORNEYS

United States Patent Office 3,271,539
Patented Sept. 6, 1966

3,271,539
TURN SIGNALING CANCELING MECHANISM
Robert T. W. Liang, Southfield, Mich., assignor to Ford Motor Company, Dearborn, Mich., a corporation of Delaware
Filed Dec. 19, 1961, Ser. No. 160,581
13 Claims. (Cl. 200—61.34)

This invention relates to a turn signaling device for a vehicle. More particularly, the invention relates to a canceling mechanism for the turn signaling device.

Devices for signaling that a vehicle is about to make a turn are well known in the art. These devices generally include a switch operating member which is manipulated by the operator of the vehicle. The switch operating member actuates a switch which, in turn, closes a path through a warning lamp circuit. The lighting of the warning lamp informs nearby drivers that the operator intends to turn the vehicle.

The signaling devices also include a means for sensing when the vehicle has completed a turn and for returning the switch operating member to an inoperative position when the completed turn is sensed, thereby terminating the warning signal. Ordinarily, this means is only operative when the steering member of the vehicle has turned through a fixed displacement. When a turn is less than this fixed displacement, the switch operating member will remain in an operative position, causing a false warning signal.

The purpose of the invention is to prevent false warning signals and to automatically return the switch operating member to its inoperative position regardless of the degree of the turn.

When the automobile is traveling along a selected path, the operator continually makes small turns or steering corrections in order to maintain the vehicle along a straight path. The invention utilizes a second means including a sensing means which will sense when the vehicle is going in a selected path or more particularly, the sensing means senses the small turns necessary to maintain the vehicle along a selected path. Under normal circumstances the operator has completed a shallow turn and is proceeding along a straight path. The sensing means will then sense the small turns or steering corrections necessary to maintain the vehicle in the straight path.

The sensing means comprises a signal means connected to the vehicle steering member and a control means connected to the switch operating member. When the switch operating member has been actuated by the operator the small turns of the vehicle steering member cause the signal means to transmit a signal to the control means. The transmission of a plurality of signals to the control means causes the switch operating member to be returned to an inoperative position under the impetus of a return means, thereby terminating the warning signal.

In the preferred embodiment the signals are transmitted by a signal means or a pawl, and the control means comprises an accumulator and the return means. More particularly, the control means comprises a ratchet wheel, a stop pawl and a cam.

The object of this invention is to provide a signal canceling mechanism that will cancel a turn signal and return the switch operating member to an inoperative position regardless of the degree of the turn.

Another object of the invention is to provide a signal canceling mechanism that senses when the vehicle is traveling along a selected path and then cancels the turn signal.

Another object of the invention is to provide a turn signal canceling mechanism that is reliable, simple and low in cost.

These and other objects and advantages of the invention will become apparent as reference is made to the specification and the drawings, wherein.

Figure 1:
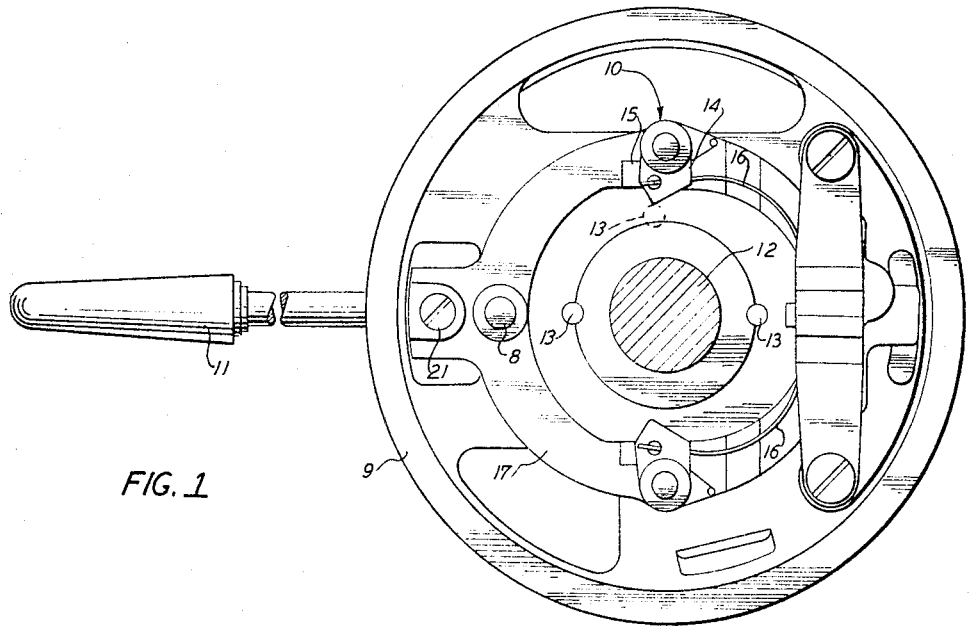
FIGURE 1 is a plan view of a conventional turn signal device.

The turn signal device shown in FIGURE 1 utilizes a conventional turn signal canceling mechanism. This canceling mechanism has a first means 10 for sensing when a fixed displacement of the vehicle steering member 12 has occurred and then returning the switch operating member 11 to an inoperative position.

The first means includes pins 13 mounted on the vehicle steering member 12 and pawl 14, stop 15, and spring 16 which are mounted on a switch member 17. The pawl 14 senses a fixed displacement of the vehicle steering member 12. The fixed displacement is sensed by pin 13 abutting pawl 14 which is pivotally attached to the switch member 17. When the pin 13 abuts the pawl 14, the pawl 14 may, in turn, abut the stop 15. Further rotation of the vehicle steering member 12 when members 13, 14 and 15 are in an abutting relationship will cause a force to be transmitted through these members to the switch member, thereby tending to rotate the switch member 17 and the switch operating member 11 from an operative to an inoperative position. The rotation of switch operating member 11 and switch member 17 to an inoperative position terminates the warning signal. The foregoing device is described in detail in U.S. Patent No. 2,725,435.

The pins 13 in the device described above are only effective to return the switch member 17 and the switch operating member 11 to an inoperative position when they are displaced at an angle that will permit them to abut the pawl 14 and stop 15. The turn signal mechanism of this invention incorporates a second sensing means which returns the switch operating member 11 and switch member 17 or 19 to an inoperative position regardless of the magnitude of the angular displacement of the pins 13.

Figure 2:
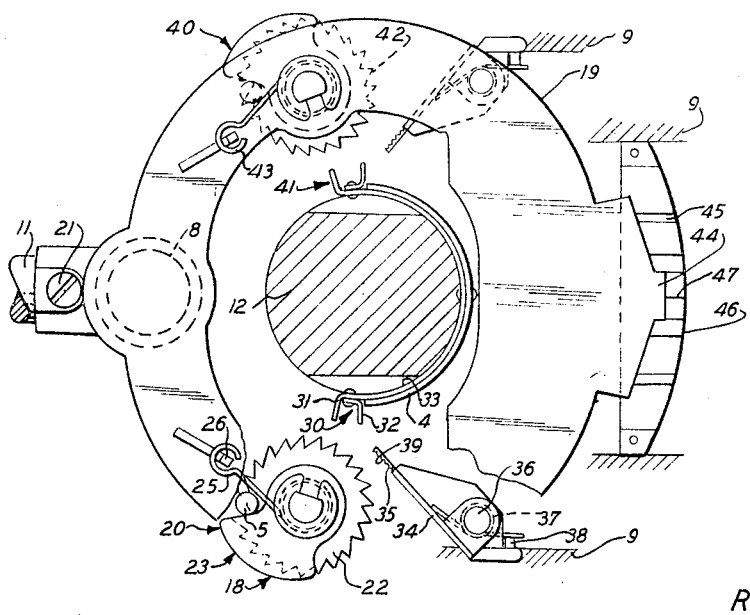
FIGURE 2 is a plan view of the improved turn signal device in the inoperative position.

Referring to FIGURE 2, a second means 18 is shown for sensing small angular adjustments of the steering wheel of the vehicle about a center position and for returning the switch member 19 to an inoperative position when a predetermined number of the small angular adjustments are sensed. This second means 18 comprises a control means 20 and a signal means 30. The control means 20 comprises a movable member or more particularly a switch member 19 which is pivotally attached to a shaft 8. The switch member 19 is rigidly attached to the switch operating member 11 by a fastening means 21. The switch member 17, described above, may be utilized to form the switch member 19 or the switch member 19 may be another member.

An accumulator such as ratchet wheel 22 is pivotally attached to the switch member 19. A return means or more particularly, cam 23 is rigidly attached to the ratchet wheel 22 to rotate with the ratchet wheel 22. The cam 23 may be rigidly attached to the same pivotal connection as ratchet wheel 22 or directly attached to the ratchet wheel 22. A resilient means 25 is rigidly attached to a pin 26 which is, in turn, fixed on the switch member 19. The resilient means 25 exerts a force on the ratchet wheel 22 and cam 23, tending to rotate the ratchet wheel 22 and the cam 23 in a clockwise direction to a zero position. The zero position of the ratchet wheel 22 and cam 23 is fixed by the pin 5 which is rigidly attached to the switch member 19. The pin 5 abuts the cam 23 when the cam 23 is in the zero position.

The vehicle steering member 12 has the signal means or more particularly a pawl 30 fixed thereto. The pawl 30 is a U-shaped member having legs 31 and 32. The leg 31 of pawl 30 is integral with a resilient band member 33. The leg 32 is an angle member which is fastened to the resilient band member 33 by means of a rivet. The resilient band member 33 is fixed to a substantially rigid tube member 4. The tube member 4 is rigidly connected to the vehicle steering member 12.

A pawl 34 having a stop portion 35 is pivotally attached to the casing by pivot 36. A torsion spring 37 is placed about the pivot 36 and is compressed between the pin 38 and the pawl 34. The torsion spring 37 urges stop portion 35 of the pawl 34 towards the teeth of the ratchet wheel 22. The pin 38 limits the counterclockwise movement of the pawl 34.

The end portion 35 of the pawl 34 has a series of small teeth 39 that are shaped to permit rotation of the ratchet wheel 22 in a counterclockwise direction and prevent rotation of the ratchet wheel 22 in a clockwise direction. The small teeth 39 aid in minimizing the clockwise slippage of the ratchet wheel 22.

Figure 3:
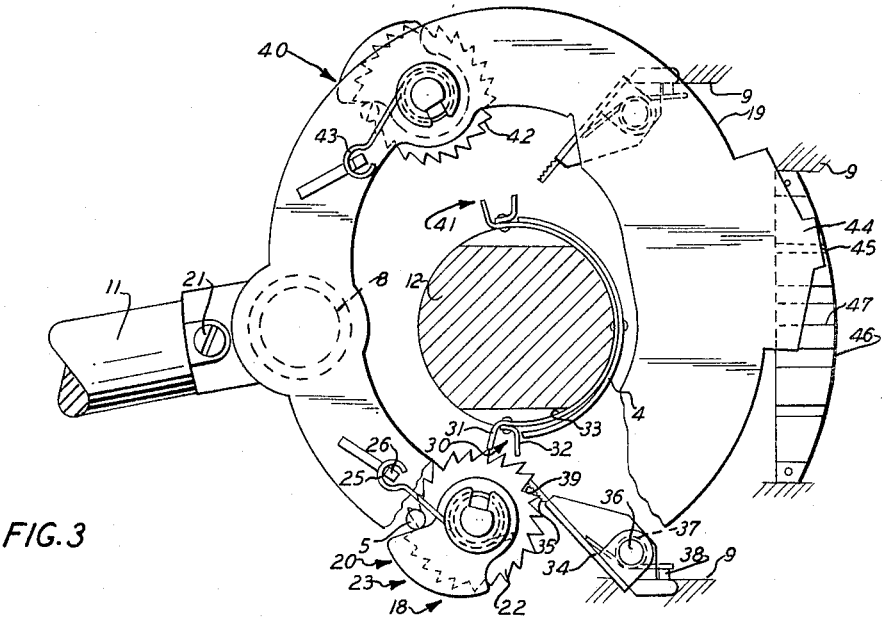
FIGURE 3 is a plan view of the improved turn signal device in a left turn position; and, FIGURE 4 is a plan view of the improved turn signal device in a left-turn position with the parts in position to be returned to an inoperative position by the return means.
Figure 4:
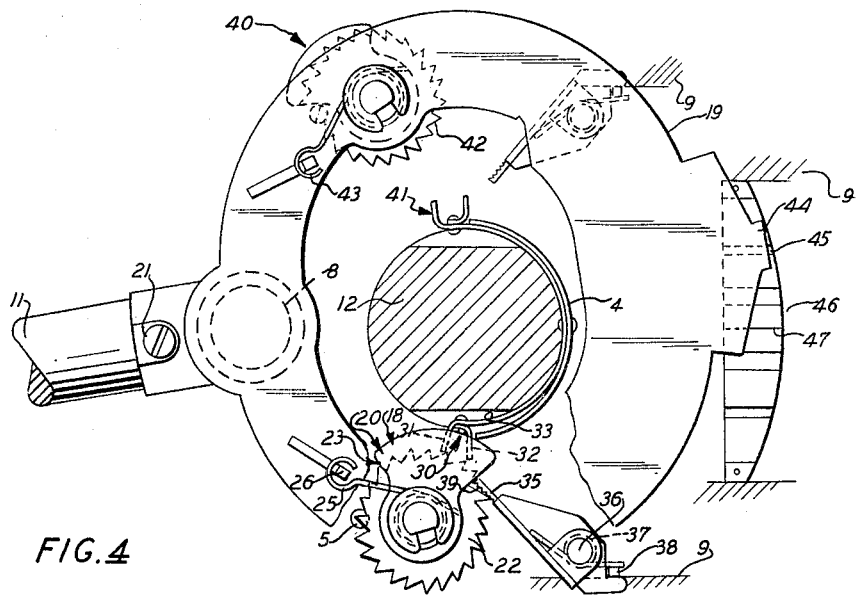

When the switch member 19 has been rotated to a left-turn position by the switch operating member 11 (shown in FIGURE 3), the pawl 30 will be in a position to rotate the ratchet wheel 22. Clockwise rotation of the vehicle steering member 12 when the turn signal mechanism is in a left-turn position will cause the leg 31 of pawl 30 to rotate the ratchet wheel 22 in a counterclockwise direction. As the vehicle steering member continues to be moved in a clockwise direction, the leg 31 will disengage the ratchet wheel 22 and the leg 32 will engage the ratchet wheel 22, thereby continuing to rotate the ratchet wheel 22. The rotation, which the vehicle steering member 12 transmits to the ratchet wheel 22, is dependent on the geometry of the pawl 30 and the ratchet wheel 22 and the position of the pawl relative to the ratchet wheel.

When the vehicle steering member 12 is rotated in a counterclockwise direction with the turn signal mechanism in a left-turn position, the resilient band 33 will be bent inwardly, thereby permitting the pawl 30 to slide over the ratchet wheel 22. The pawl 34 prevents the ratchet wheel 22 from being returned to the zero position by the resilient means 25 and the sliding action of the pawl 30 when moving in a counterclockwise direction.

The control means 40 and the signal means 41 operate on the same principle and utilize the same elements as the control means 20 and the signal means 30. The signal means 41, however, rotates the ratchet wheel 42 in a clockwise direction and the resilient means 43 tends to urge the ratchet wheel in a counterclockwise direction. The control means 40 functions to return the switch member 18 from a right-turn position of an inoperative position.

In operation, the operator of the vehicle actuates the switch operating member 11 from an inoperative position to a right or left turn position. For the sake of an exemplary description, the left-turn position will be considered and it is assumed that a shallow turn that is ineffective to actuate the first sensing means (FIGURE 1) has been completed. When the switch 11 is placed in a left-turn position (shown in FIGURE 3), the switch member 19 is rotated in a counterclockwise direction so that stop member 44 slides into engagement with notch 45 of the resilient biasing means 46. With the switch member 19 in the left-turn position, the control means 20 is in position to be engaged by the signal means or more particularly pawl 30.

Assuming that the vehicle steering member 12 is turned through a small turning angle and returned to the zero position of the vehicle steering member 12, the signal means 30 would be in position to actuate the accumulator or ratchet wheel 22 in a counterclockwise direction. The small angular adjustments of the vehicle steering member 12 necessary to maintain the vehicle along a straight path will cause the signal means 30 to sporadically actuate the accumulator 22. These successive signals are transmitted from the signal means 30 to the accumulator 22 and results in the return means or more particularly the cam 23 being displaced. The displacement of the cam 23 will eventually result in its contacting the rigid tube member 4 which is attached to the vehicle steering member 12. The contacting of the tube member 4 by the cam 23 will cause a force to be exerted upon the cam 23 and, in turn, upon the switch member 19. This force creates a torque about the pivot 8. The torque tends to rotate the switch operating member 11 and switch member 19 in a clockwise direction, thus causing the stop member 44 to slide over the resilient biasing means 46 into notch 47. When the stop member 44 is in the notch 47, the switch member 19 and the switch operating member 11 are in the inoperative position.

It will be understood that the invention is not to be limited to the exact construction shown and described and that various changes and modifications may be made without departing from the spirit and scope of the invention, as defined in the appended claims.

I claim:

1. A turn signal mechanism for an automotive vehicle comprising: a steering member, a switch member positioned adjacent said steering member and having an operative and an inoperative position, first means coupled to said switch member and cooperating with an actuating means mounted upon said steering member for moving said switch member from its operative to its inoperative position upon a preselected rotation of said steering member, second means coupled to said switch member and cooperating with a signal means mounted upon said steering member for moving said switch member from its operative to its inoperative position under the impetus of a plurality of small steering adjustments of said steering member that occur when the vehicle is traveling in an essentially straight path.

2. In a turn signaling mechanism, the combination comprising: a vehicle steering member, said steering member having a zero position for steering the vehicle in a straight path, a movable switch member positioned adjacent said steering member, said switch member having an operative and an inoperative position, a switch operating member connected to said switch member for moving said switch member from an inoperative position to an operative position, a first means operatively coupling said steering member and said switch member for sensing a fixed movement of said steering member and for returning said switch member from said operative position to said inoperative position when said fixed movement is sensed, a second means operatively coupling said steering member and said switch member for sensing the small adjustments of said steering member about said zero position and for returning said switch member to an inoperative position when a predetermined number of said small adjustments of said vehicle steering member are sensed.

3. In a direction signaling mechanism, the combination comprising: a vehicle steering member, said steering member having a zero position for steering the vehicle in a substantially straight path, and a plurality of other positions for turning the vehicle, a movable switch member positioned adjacent said steering member, said switch member having an operative and inoperative position, a switch operating member connected to said switch member for moving said switch member from said inoperating position to said operative position, a first means operatively coupling said vehicle steering member and said switch member for sensing a fixed movement of said vehicle steering member and for returning said switch member from said operative position to said inoperative position when said fixed movement is sensed, a second means operatively coupling said vehicle steering member and said switch member for sensing small adjustments of said steering member about the zero position of said steering member, said adjustments being incidental to maintaining a vehicle in a straight path, said second means including means for returning said switch member to an inoperative position when a predetermined number of said adjustments have been sensed.

4. In a direction signaling mechanism, the combination comprising: a vehicle steering member, said steering member having a zero position for steering the vehicle in a straight path, a movable switch member positioned adjacent said steering member, said switch member having an operative and inoperative position, a switch operating member connected to said switch member for moving said switch member from said inoperative position to said operative position, a first means operatively coupling said vehicle steering member and said switch member for sensing a fixed movement of said steering member and for returning said switch member from said operative position to said inoperative position when said movement is sensed, a second means, said second means comprising, a control means operatively coupled to said switch member for receiving a given number of signals and for returning said switch member to an inoperative position when said number of signals have been received, and a signal means carried by said steering member and operatively coupled to said control means when said switch member is in the operative position for transmitting signals from said steering member to said control means.

5. In a direction signaling mechanism, the combination comprising: a vehicle steering member, said steering member having a zero position for steering the vehicle in a straight path, a movable switch member positioned adjacent said steering member, said switch member having an operative and an inoperative position, a switch operating member connected to said switch member for moving said switch member from said inoperative to said operative position, a first means operatively coupling said vehicle steering member and said switch member for sensing a fixed movement of said vehicle steering member and for returning said switch member from said operative position to said inoperative position when said fixed movement is sensed, a second means, said second means comprising, a rotatable member pivotally mounted on said switch member, said rotatable member adapted to be rotated from a first position to an end position, an actuating means for sporadically actuating said rotatable member, said actuating means operatively coupled to said vehicle steering member, a stop means operatively coupled to said rotatable member for maintaining said rotatable member in the incremental position that the rotatable member assumes when traveling from said first position to said end position, a return means for returning said switch member from said operative position to said inoperative position when said rotatable member has reached said end position, said return means being operatively coupled to said rotatable member and said switch member.

6. In a direction signaling mechanism, the combination comprising: a vehicle steering member, said steering member having a zero position for steering the vehicle in a straight path, a movable switch member positioned adjacent said steering member, said switch member having an operative and an inoperative position, a switch operating member connected to said switch member for moving said switch member from an inoperative position to an operative position, a first means operatively coupling said steering member and said switch member for sensing a fixed movement of said steering member and for returning said switch member from said operative position to said inoperative position when said fixed movement is sensed, a second means, said second means comprising an accumulator coupled to said switch member for accumulating signals, a signal means mounted on said steering member and engaging said accumulator when said switch member is in the operative position for transmitting signals from said vehicle steering member to said accumulator, a return means coupled to said accumulator for returning said switch member from said operative position to said inoperative position when said accumulator has accumulated a predetermined number of signals.

7. In a turn signaling mechanism, the combination comprising: a vehicle steering member, said steering member having a zero position for steering the vehicle in a straight path, a movable switch member positioned adjacent said steering member, said switch member having an operative and an inoperative position, a switch operating member connected to said switch member for moving said switch member from an inoperative position to an operative position, means operatively coupling said steering member and said switch member for sensing the small adjustments of said steering member about said zero position and for returning said switch member to an inoperative position when a predetermined number of said small adjustments of said vehicle steering member are sensed.

8. In a direction signaling mechanism, the combination comprising: a vehicle steering member, said steering member for steering the vehicle in a selected path, a movable switch member positioned adjacent said steering member, said switch member having an operative and inoperative position, a switch operating member connected to said switch member for moving said switch member from said inoperative position to said operative position, a sensing means operatively coupling said steering member and said switch member for sensing small adjustments of said steering member when said steering member is steering the vehicle along a selected path, the adjustments being incidental to maintaining the vehicle in said selected path, and a return means operatively coupling said sensing means and said switch member for returning said switch member to an inoperative position when a predetermined number of said adjustments have been sensed.

9. In a direction signaling mechanism, the combination comprising: a vehicle steering member, said steering member for steering the vehicle in a selected path, a switch member mounted adjacent the vehicle steering member, said switch member having an operative and inoperative position, a switch operating member connected to said switch member for moving said switch member to an operative position, a control means carried by said switch member for receiving a plurality of signals and for returning said switch member to an inoperative position when a predetermined number of signals have been received, and a signal means mounted on said said steering member and operatively engaging said control means when said switch member is in the operative position for transmitting signals from said steering member to said control means.

10. A turn signal mechanism for an automotive vehicle comprising: a steering member, a switch member positioned adjacent said steering member and having an operative and an inoperative position, first means operatively coupling said switch member and said steering member for moving said switch member from its operative to its inoperative position upon a preselected fixed movement of said steering member, and second means responsive to a predetermined number of small steering adjustments of said steering member that are made when the vehicle is traveling in an essentially straight line path and operatively coupling said switch member and said steering member for moving said switch member from its operative to its inoperative position upon the occurrence of said predetermined number of small steering adjustments.

11. In a direction signaling mechanism, the combination comprising: a vehicle steering member, said steering member for steering the vehicle in a selected path, a movable switch member mounted adjacent said vehicle steering member, said switch member having an operative and inoperative position, and a sensing means operatively coupling said steering member and said switch member when said switch member is in the operative position for sensing small adjustments of said steering member when said steering member is steering the vehicle along a selected path, said adjustments being incidental to maintaining the vehicle in said selected path, and a return means coupling said sensing means and said switch member for returning said switch member to an inoperative position when a predetermined number of said adjustments have been sensed.

12. In a turn signaling mechanism the combination comprising a vehicle steering member, said steering member for steering a vehicle along a desired path, a movable switch member mounted adjacent said steering member, said switch member having an operative position for operating a turn signal and an inoperative position, a manually operable switch operating lever connected to said switch member for moving said switch member from said inoperative position to said operative position, a first means operatively coupling said steering member and said switch member for sensing a fixed displacement of said steering member and for returning said switch member from said operative position to said inoperative position when said fixed displacement is sensed, a second means comprising a pawl member attached to said steering member, a ratchet wheel rotatably mounted on said switch member and located on said switch member so that the movement of said switch member to an operative position enables said pawl member to rotate said ratchet wheel in a given direction when said steering member is adjusted incident to maintaining the vehicle along a desired path, a stop pawl mounted adjacent said ratchet wheel and adapted to maintain said ratchet wheel in substantially any rotated position, a cam connected to said ratchet wheel and adapted to contact said vehicle steering member, whereby the switch member is returned to an inoperative position when said ratchet wheel is moved through a given displacement by said pawl.

13. In a turn signaling mechanism the combination comprising a vehicle steering member, said steering member for steering a vehicle along a desired path, a movable switch member positioned adjacent said steering member, said switch member having an operative position for operating a turn signal and an inoperative position, a manually operable switching operating lever connected to said switch member for moving said switch member from said inoperative position to said operative position, a first means operatively coupling said steering member and said switch member for sensing a fixed displacement of said steering member and for returning said switch member from said operative position to said inoperative position when said fixed displacement is sensed, a second means comprising a pawl member attached to said steering member, a ratchet wheel rotatably mounted on said switch member and located on said switch member so that the movement of said switch member to an operative position enables said pawl member to rotate said ratchet wheel, said pawl member adapted to rotate said ratchet wheel in a given direction when said steering member is adjusted incident to maintaining the vehicle along a desired path, a return spring urging said ratchet wheel in a direction opposed to the direction which said pawl rotates said ratchet wheel, a stop pawl mounted adjacent said ratchet wheel and adapted to maintain said ratchet wheel in a rotated position against the force of said return spring when said switch member is in an operative position, a cam connected to said ratchet wheel for unitary rotation therewith, and a surface contacting said cam when said cam is moved through a given displacement, whereby the switch member is returned to an inoperative position when said ratchet wheel is moved through a given displacement by said pawl.

References Cited by the Examiner

UNITED STATES PATENTS

| | | | |
|---|---|---|---|
| 1,928,315 | 9/1933 | Martin et al. | 200—61.32 |
| 2,725,435 | 11/1955 | Cislo | 200—61.34 |
| 2,824,917 | 2/1958 | Hollins | 200—61.27 |
| 3,020,774 | 2/1962 | Kullman | 74—142 |
| 3,190,981 | 6/1965 | Brown | 200—61.34 |

BERNARD A. GILHEANY, *Primary Examiner.*

A. M. LESNIAK, H. A. LEWITTER,
*Assistant Examiners.*